Patented Aug. 27, 1935

2,012,890

UNITED STATES PATENT OFFICE 2,012,890

MANUFACTURE OF METALLIC ALLOYS AND ARTICLES MADE THEREFROM

Charles Philip Miller, Romiley, England, assignor to Carboloy Company Inc., a corporation of New York No Drawing. Application December 5, 1931, Serial No. 579,348. In Great Britain April 21, 1931

13 Claims. (Cl. 148—21.5)

This invention has reference to metallic alloys and to articles made therefrom and has for its object to provide an alloy which is particularly suited for cutting tools and which is capable of being easily worked so as to manufacture it into articles required, the articles so produced being capable of receiving a high degree of local hardness without detracting from the general toughness of the article as a whole.

In the manufacture of hard metallic steel alloys as at present used e. g. for cutting tools it is known to use high percentages of metals such as tungsten, molybdenum, chromium and cobalt; these alloys have however as a general rule been hard and brittle, and consequently have been incapable of being forged or machined; as they do not respond to heat treatment and can only be cast and afterwards ground to the desired shape. If such alloys have not these hard and brittle characteristics they are similar to high speed steel and contain substantial proportions of carbon and chromium as essential constituents, they can be forged and machined, but in common with high speed steels which are hardened from yellow to a white heat, owing to distortion and scaling during this process it is necessary for articles made from them, to be ground or stoned in order to make them accurate, as when used as tools and for which efficient cutting edges are required.

It is also known that these alloys can be improved in cutting efficiency by reheating articles such as tools made from them to temperatures up to about 650° C., though very little extra hardness is obtained by this treatment, and if the treatment be carried too far the result may cause a softening and deficiency in the cutting powers of the tool. Thus this secondary treatment is of very little use for regulating the hardness of the material, as once the alloy is made softer by this reheating process any further heat, as for instance heat generated during use, will in general make the alloy still softer and more prone to wear.

By means of the present invention, alloys are provided which have a high degree of hardness especially at high temperatures and very desirable cutting properties when employed as metal cutting tools.

According to this invention metallic alloys and articles made therefrom are as far as possible free from carbon, and contain—cobalt (from 20% to 35%) tungsten or molybdenum either together or separately from 15% to 30% the balance being iron, vanadium up to 3% and manganese up to .6% may be added to facilitate forging. The alloys made in this manner are forgeable and machineable and after suitable heat treatment can be shaped accurately to the required form and can be hardened to any required degree of hardness without scaling or distorting by heating the forged or machined article to a temperature varying from 250° C. to 650° C.

According to one embodiment of the invention as applied by way of example to the manufacture of an alloy and to a cutting tool for a lathe made therefrom, the alloy is prepared by melting in a suitable furnace which should be as free as possible from any trace of carbon. The greater part of the alloy is made up of iron, with cobalt from 20% to 35%, tungsten or molybdenum together or separately totaling from 15% to 30%, vanadium up to 3% and manganese up to .8%. An alloy so made is cast into moulds and the ingots from the moulds are reheated, being kept as far as possible free from contact with carbon and forged, rolled, pressed or otherwise treated as required in a manner similar to the treatment of high speed steels.

After this treatment the alloy is annealed and after annealing is found to be easily machineable. A further heat treatment is now given to the alloy. In this heat treatment the temperature is raised to from 1,000 to 1,400° C. the actual temperature used being determined by the ultimate hardness required and also by the composition of the alloy. After this heating the alloy is cooled quickly and as a result of the treatment it assumes a tough state or condition and unlike high speed steel after a similar treatment it can be filed and machined, the metal produced is thus quite unlike high speed steel. After this treatment the toughened metal can be filed and machined into the desired shape such as into a lathe cutting tool and the made tool is next hardened in order to give it its cutting efficiency. This hardening consists in reheating part or the whole of the tool or article to 250° C. to 650° C. depending on requirement, and after the heating the cooling is effected as is convenient and required, for instance a quick cooling will be necessary to prevent the heat travelling to other parts of the articles when local heating is employed to get local hardening and thus the tip or cutting end of a tool can be given an efficient cutting edge without embrittling the tool.

In general the hardening increases with the temperature, and the hardness can be regulated from the toughened machineable state to the maximum hardness attainable by the alloy, and this hardness may be increased to a point which would be too brittle for certain purposes, it is consequently a matter in which experience must be used to decide the required temperature for tools or articles made for certain specified purposes.

When a tool of this alloy is heated to a temperature below that which gives it its maximum hardness in order to obtain a less brittle tool, then any heat generated in use will, if of the necessary intensity, have the effect of hardening the part effected still further, thus helping to resist wear. The heat generated by use will have the reverse effect to that obtained when high speed steel is used and where hardness has been sacrificed to toughness.

A suitable alloy for tools has been made comprising—cobalt 30%, tungsten 23%, vanadium 1.5%, manganese .2%, carbon, silicon and other impurities not exceeding .3% together, the balance being made up of iron. With an alloy of this composition the first heat treatment after annealing and rough machining consisted in raising the temperature to 1,280° C. and after raising to this temperature and cooling quickly the tools could be filed to shape comparatively easily. After filing to shape the tools were heated to 500° C. for tools to be used on steel for heavy work and up to 630° C. for finishing tools for cast iron and brass.

What I claim as my invention and desire to secure by Letters Patent is:—

1. A substantially carbon free metal cutting tool, said tool being age hardened and consisting of about 20% to about 35% cobalt, about 15% to about 30% metal from a group consisting of tungsten and molybdenum, an appreciable quantity up to about 3% vanadium, an appreciable quantity up to about .8% manganese, the remainder of said alloy, except for minor impurities, being iron.

2. An alloy metal cutting tool containing about 20 to 35% cobalt, about 15 to 30% of metal from a group consisting of tungsten and molybdenum, from a fractional quantity up to about 3% vanadium, an appreciable quantity up to about .6% manganese, the remainder of said alloy, except for minor impurities, being iron.

3. A substantially carbon-free alloy comprising about 30% cobalt, about 23% metal from a group consisting of tungsten and molybdenum, about 1.5% vanadium, about .2% manganese, the remainder of said alloy being iron.

4. An age hardened, hard, tough alloy containing about 20 to 35% cobalt, about 15 to 30% of metal from a group consisting of tungsten and molybdenum, an appreciable quantity and up to about 3% vanadium, an appreciable quantity and up to about .6% manganese, the remainder of said alloy, except for minor impurities, being iron.

5. An alloy heat treated at 1000° C. to 1400° C., quickly cooled and hardened by reheating at 250° C. to about 650° C., said alloy containing about 20 to 35% cobalt, about 15 to 30% of metal from a group consisting of tungsten and molybdenum, an appreciable quantity and up to about 3% vanadium, an appreciable quantity and up to about .6% manganese, the remainder of said alloy, except for minor impurities, being iron.

6. The process of producing a substantially carbon free alloy consisting of about 20% to about 35% cobalt, about 15% to about 30% of metal from a group consisting of tungsten and molybdenum, an appreciable quantity up to 3% vanadium, an appreciable quantity up to .8% manganese, the remainder of the alloy being iron which comprises heating the alloy at a temperature not appreciably lower than 1000° C. and below the melting point of the alloy and quenching the alloy to thereby toughen it and permit machining, reheating only a portion of the alloy to a temperature of about 250° C. to 650° C. and cooling the alloy to thereby produce local hardening of the alloy.

7. The process of producing a substantially carbon free alloy cutting tool consisting of about 20% to about 35% cobalt, about 15% to about 30% of metal from a group consisting of tungsten and molybdenum, an appreciable quantity up to 3% vanadium, an appreciable quantity up to 15 .8% manganese and the balance iron, which comprises heating the alloy at a temperature not appreciably lower than 1000° C. and below the melting point of the alloy, quickly cooling the alloy, machining the alloy into a desired shaped tool provided with a cutting edge portion, reheating only said cutting edge portion to a temperature below 1000° C. but not lower than 250° C. and cooling the tool to thereby produce local hardening.

8. The process of producing a hard, tough, substantially carbon-free alloy consisting of about 20 to 35% cobalt, about 15 to 30% of metal from a group consisting of tungsten and molybdenum, an appreciable quantity up to about 3% vanadium, an appreciable quantity up to about .6% manganese, the remainder of said alloy being iron, which comprises heating said alloy to an elevated temperature not appreciably lower than 1000° C. but below the melting point of said alloy, quenching said alloy and reheating it to a temperature above 250° C. but lower than 1000° C. to thereby harden the alloy.

9. The process of producing a hard, tough, substantially carbon-free alloy consisting of about 20 to 35% cobalt, about 15 to 30% of metal from a group consisting of tungsten and molybdenum, an appreciable quantity and up to about 3% vanadium, an appreciable quantity and up to about .6% manganese, the remainder of said alloy being iron, which comprises heating said alloy to a temperature of 1000° C. to 1400° C. but below the melting point of said alloy, quenching said alloy and reheating it to a temperature of 250° C. to 650° C.

10. The process of producing a hard, tough, substantially carbon-free alloy consisting of about 20 to 35% cobalt, 15 to 30% of metal from a group consisting of tungsten and molybdenum, an appreciable quantity and up to about 3% vanadium, an appreciable quantity and up to about .6% manganese, the remainder of said alloy being iron, which comprises casting said alloy into ingots, reheating said ingots out of contact with carbon, mechanically working said ingots, annealing said mechanically worked alloy, heating the alloy to 1000° C. to 1400° C., cooling it and reheating it to 250° C. to 650° C.

11. An alloy containing about 30% cobalt, about 19% tungsten, about 3% molybdenum, about 2% vanadium, about 0.5% manganese, the remainder of the alloy, except for minor impurities, consisting of iron.

12. A substantially carbon free alloy containing about 20% to about 35% cobalt, about 15% to about 30% of metal from a group consisting of tungsten and molybdenum, an appreciable quantity up to about 3% vanadium, an appreciable quantity up to about 0.8% manganese, the remainder of said alloy, except for minor impurities, consisting of iron.

13. The process of producing a substantially carbon free alloy containing about 20% to about 35% cobalt, about 15% to 30% of metal from a group consisting of tungsten and molybdenum, an appreciable quantity up to about 3% vanadium, an appreciable quantity up to about 0.8% manganese, the remainder of said alloy, except for minor impurities, consisting of iron, which comprises heating said alloy at a temperature above 1000° C., quickly cooling the alloy, and thereafter aging the alloy.

CHARLES PHILIP MILLER.

CERTIFICATE OF CORRECTION.

Patent No. 2,012,890.                                              August 27, 1935.

CHARLES PHILIP MILLER.

It is hereby certified that error appears in the printed specification of the above numbered patent requiring correction as follows: Page 1, second column, after line 51, insert the following paragraph:

In quickly cooling the alloy from a temperature of 1000°C. to 1400°C., the quenching action need not be as drastic as with ordinary steel. For example, it is sufficient to cool small pieces of the alloy in the open air and larger pieces may be quenched satisfactorily by using an air blast. Oil quenching may be employed when convenient but in general it is not as satisfactory as air quenching.

And that the said Letters Patent should be read with this correction therein that the same may conform to the record of the case in the Patent Office.

Signed and sealed this 8th day of October, A. D. 1935.

Leslie Frazer (Seal)                                                            Acting Commissioner of Patents.